UNITED STATES PATENT OFFICE.

WALTER SCHOELLER AND WALTHER SCHRAUTH, OF BERLIN, GERMANY, ASSIGNORS TO FARBENFABRIKEN VORM. FRIEDR. BAYER & CO., OF ELBERFELD, GERMANY, A CORPORATION OF GERMANY.

ANTIFOULING PAINT AND VARNISH.

967,842.  Specification of Letters Patent.  Patented Aug. 16, 1910.

No Drawing.  Application filed May 20, 1909. Serial No. 497,305.

*To all whom it may concern:*

Be it known that we, WALTER SCHOELLER and WALTHER SCHRAUTH, doctors of philosophy, chemists, citizens of the German Empire, residing at Berlin, Germany, have invented new and useful Improvements in Antifouling Paints and Varnishes, of which the following is a specification.

Our invention relates to the manufacture of preparations suitable as coatings, paints or varnishes which are remarkable for their good preservative properties. They prevent e. g. animal and vegetable growth from forming on the object coated, such as on ships' bottoms etc. It has been hitherto attempted to attain this end by adding certain poisonous salts or strong bases to the coating material. The substances used are, however, either not sufficiently effective or quite useless. We have now found that by using for this purpose salts of oxymercuric substituted organic acids the desired effect is produced in every respect in the best possible manner. The calcium salt of oxymercuric acetic acid:

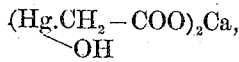

the copper salt of oxymercuric butyric acid:

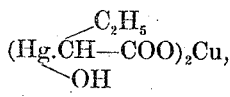

the lead salt of oxymercuric salicylic acid:

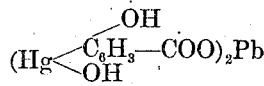

etc., may be used for the production of the preservative paints, etc. The latter product is a salt of the substance known as hydrargyrum · salicylicum in the German *Pharmacopœia*, while the former preparations are made in accordance with the directions given in our German Patent No. 208,634 and in accordance with the publication in the *Berichte der Deutschen Chemischen Gesellschaft*, vol. 35, page 2870. The products referred to and described in our applications Serial Nos. 497,302 and 497,303 may also be advantageously employed for the purposes of this invention.

A useful preparation can be obtained for instance by mixing 1 part of one of the mentioned substances with 25 parts of a suitable coating material such as varnishes, paints, etc. but the quantities and the solvents may be varied without altering thereby the nature of the invention.

We claim:

1. As new articles of manufacture a coating material comprising a salt of an oxymercuric substituted organic acid in conjunction with other suitable substances, substantially as described.

2. As a new article of manufacture a coating material comprising a salt of oxymercuric salicylic acid in conjunction with other suitable substances, substantially as described.

In testimony whereof we have hereunto set our hands in the presence of two subscribing witnesses.

WALTER SCHOELLER.
WALTHER SCHRAUTH.

Witnesses:
HENRY HASPER,
WOLDEMAR HAUPT.